United States Patent [19]

Yamamoto

[11] Patent Number: 4,707,120
[45] Date of Patent: Nov. 17, 1987

[54] METHOD AND APPARATUS FOR EXPOSURE CORRECTION IN COLOR PRINTING FROM EXPOSED PHOTOGRAPHIC COLOR FILM

[75] Inventor: Takashi Yamamoto, Tokyo, Japan

[73] Assignee: Fuji Photo Film Co., Ltd., Kanagawa, Japan

[21] Appl. No.: 917,191

[22] Filed: Oct. 9, 1986

[30] Foreign Application Priority Data

Oct. 9, 1985 [JP] Japan ................................. 60-225299
Oct. 9, 1985 [JP] Japan ................................. 60-225301

[51] Int. Cl.⁴ ............................................. G03B 27/80
[52] U.S. Cl. ...................................................... 355/38
[58] Field of Search ....................... 355/32, 35, 38, 68, 355/77, 83, 88

[56] References Cited

U.S. PATENT DOCUMENTS

| | | | |
|---|---|---|---|
| 4,080,061 | 3/1978 | von Stein et al. | 355/38 |
| 4,264,196 | 4/1981 | von Stein et al. | 355/384 |
| 4,274,732 | 6/1981 | Thurm et al. | 355/38 |
| 4,371,259 | 2/1983 | Howitt | 355/38 |
| 4,403,854 | 9/1983 | von Stein et al. | 355/38 X |
| 4,417,811 | 11/1983 | Hamer | 355/77 |
| 4,448,521 | 5/1984 | Shiota | 355/38 X |
| 4,561,768 | 12/1985 | Fürsich et al. | 355/38 |
| 4,577,961 | 3/1986 | Terashita | 355/38 X |
| 4,659,213 | 4/1987 | Matsumoto | 355/38 |

Primary Examiner—Richard A. Wintercorn
Attorney, Agent, or Firm—Young & Thompson

[57] ABSTRACT

A standard exposure is established to make a desirable color print from a standard negative frame of a specific type of color original film. A negative frame of a color original film from which a color print is to be made is visually observed to judge the difference in color balance and in density from the standard frame and to determine correction values according to these differences. Upon printing, the type of the color original film is automatically detected, so as to choose automatically the appropriate one of the correction values which have been previously established according to the differences in density of various types of color original films. The frame-dependent correction values and the film-type-dependent correction value are added, so as to provide a total correction value based on which the standard exposure is corrected so as to make a fine color print from the frame.

7 Claims, 8 Drawing Figures

METHOD AND APPARATUS FOR EXPOSURE CORRECTION IN COLOR PRINTING FROM EXPOSED PHOTOGRAPHIC COLOR FILM

BACKGROUND OF THE INVENTION

The present invention relates to an exposure correction method and apparatus used for making color prints from exposed color negative films.

In amateur photography, exposed color negative films often include improper exposures, which are, in general, classified into several categories, namely: underexposed negatives, over-exposed negatives, too high- or too low-contrast negatives and so forth. Even from these improper negatives, it is essential from the commercial point of view to make fine color prints with proper color balance and density. To this end, it is usual to control correctively the exposure or the proportion of the three primary color (blue, green and red) components of the printing light in accordance with the individual frames of the negative images to adjust the color balance and density. This corrective exposure control derives from R. M. Evans' theory which is disclosed in his U.S. Pat. No. 2,571,697 and is based on the observation that the proportions of the three primary color components of light-transmitting color negatives of general subjects are substantially equal to each other, that is, are constant. That is to say, the total transmitted light after integration will be gray or a certain hue close to gray. Because the hue of gray or close to gray can be obtained from equivalent exposures from blue, green and red, an exposure of each color component is correctly controlled so as to provide the equivalent exposure in color printing. This printing system is well known in the art as the LATD printing system.

Incidentally, because the exposure time for a negative depends not only on its principal part but also on its background, it is difficult to reproduce correctly the principal part from a negative whose background density is improper, namely too thick or too thin, even if the principal part of the negative is proper. Such negatives, which are hereafter called subject failure negatives, require corrective exposure when printing. For meeting this requirement, an inspection of the negatives is performed, to find the subject failure negatives and manually to set the necessary exposure correction parameters according to the nature of the failures in a printing control means before printing. The subject failure negatives are, in general, classified into two types: density failure negatives the density of whose principal part is improper, and color failure negatives the color balance of whose principal part is improper. Good examples of density failure negatives are negatives that are exposed in backlight, that include a human figure in artificial light at night, that include a human figure against a too bright background, for example sunlit snow, and so forth. On the other hand, as the color failure negatives which have a wide distribution of one specific color thereover, there can be cited as examples such negatives that are exposed with a red scene for a background, that are exposed with a green law for a background, that are exposed against the sea, and so forth.

In addition to the subject failure negatives, there are negatives which require corrective exposure when printing for making fine color prints therefrom. Some examples of these negatives are negatives that are exposed in lights other than daylight, for example light from a fluorescent lamp or from a tungsten lamp (which are in this specification referred to as special light negatives), that are under- or over-exposed to an extreme degree, or that have changed with the passage of time (the last two are in this specification referred to as unusual negatives).

In view of the above, in the conventional color printing apparatus, an exposure time is so chosen that a desirable fine color print can be made on a specific color photographic paper from a standard frame (whose negative image transmits the equivalent components of printing light for the three primary colors and has a standard density) of a specific color negative film, for example HR-100 color film (trade name of film marketed by Fuji Photo Film Co., Ltd.), which is chosen as a standard film type. The exposure time thus chosen is corrected in accordance both with the film type of the color negative film and with the negative image pattern of each frame of the color negative film.

For the above exposure time correction, the respective frames of negative images are inspected to find the exceptional frames of negative images such as the subject failure negatives, the unusual negatives, etc. and to determine the correction values necessary for these exceptional frames according to the characteristic patterns of the negative images of those frames based on experience. This correction value determination is made as to each of the three primary colors and the density for every frame and is implemented by entering the correction values into a print controller through color correction keys and density correction keys or function keys. Using the correction values together with the large area transmittance densities of the three primary colors of the frame, an actual exposure or exposure time $Ti$ for each primary color is calculated by use of the following equation:

$$\text{Log } Ti = a_i(Di - DNi) + Ki + \text{Log}\left(\frac{D\kappa}{100}\right)^N + \text{Log}\left(1 + \frac{Di\kappa}{100}\right)^{Mi} \quad (I)$$

wherein
- i is the examined one of the three primary colors, blue, green and red
- Di is the large area transmittance density of an exceptional frame
- DNi is the large area transmittance density of the standard frame
- di is a coefficient
- Ki is the exposure time for the standard frame
- $D\kappa$ is the difference in correction (%) between successive density correction keys
- $Di\kappa$ is the difference in correction (%) between successive color correcton keys
- N is the number of increments of density correction to be entered by manipulation of the density correction keys
- Mi is the number of increments of color correction to be entered by manipulation of the color correction keys.

It should be noted in equation (I) that the values of the characters $ai$, $Ki$ depend on the types of color photographic papers to be used and on the printing sizes (enlargement rates).

In the conventional printing apparatus, the color negative film is visually inspected frame by frame by an inspector for the determination of film type. This film type determination is made based on the difference of the film in base density and the characters printed on the margin of the film. With the determination of the necessary exposure correction depending on the film type (the value of which is hereinafter abbreviated to FTDCV), the values of the necessary exposure corrections are determined for each primary color and density for each exceptional frame of the color negative film such as the subject failure negatives, the special light negatives and the like. The framedependent exposure correction values (which are hereinafter abbreviated to FDCV's) are entered by the inspector as the numbers of steps N, Mi for correction in the color printing apparatus, through the color and density correction keys. More specifically, the inspector visually observes a frame of an exceptional negative image (an exceptional frame) to determine the FDCV's according to its image pattern based on his or her experience, and then determines the numbers of steps N, Mi from the FTDCV and FDCV's by mental arithmetic.

In the conventional color printing apparatus, however, this visual inspection is extremely troublesome and is apt to lead to misjudgements of film type in case the color negative films to be inspected are of a density close to each other or similar characters or letters are printed on the margins of color negative films to be inspected. This misjudgment results in the serious drawback of producing substandard color prints which are undesirable as commercial products.

OBJECT OF THE INVENTION

It is therefore an object of the present invention to provide an exposure correction method and apparatus for use with color printers which can eliminate the production of undesirable color prints from unusual negatives owing to misjudgment of film type.

It is another object of the present invention to provide an exposure correction method and apparatus for use with color printers which allows inspecting negative images of a color negative film without the need to pay attention to the film type of the negative film.

SUMMARY OF THE INVENTION

In accordance with the present invention each negative frame of a color film is correctively exposed depending on the difference between the negative frame and a standard frame of a standard color film. This exposure correction is made based both on the difference of film type between the color film and the standard color film and on the difference in color balance and density between the frame to be printed and a standard frame of the standard color film. In order to determine the film type of the color film to be printed, a bar-code indicating the film type printed on the margin of the color film is read automatically to determine a film-type dependent parameter of the FTDCV for exposure correction by reading out, in accordance with the read film type, from a memory wherein parameters or FTDCV's corresponding to various types of color films are stored. Either before or during printing, the negative frame is visually inspected to judge the difference thereof from the standard frame, and based on this judgment, frame-dependent parameters or FDCV's for exposure correcton are determined for the three primary colors and the density. These FTDCV's and FDCV's are substituted into an exposure calculation equation to obtain the corrected exposures for the three primary colors for exposure control in the LATD system. The FTDCV's and FDCV's are represented as the numerals or letters on the corresponding correction keys.

According to an important feature of the present invention, the film type of a color film to be printed can be automatically determined by reading the bar-code printed on the color film, which enables the decision as to the frame-dependent correction values (FDCV's) to be made without the need to give any consideration of the type of the color film, resulting not only in easy negative inspections but also in a reduction in the number of substandard color prints.

It should be understood in this specification that a large area transmittance density in the LATD color printing system means a mean transmittance density of a relatively wide area. In this sense, it is permissible to use a mean transmittance density of a central area or of an area surrounding the central parts of the whole area, for example, an area covering 30%, 50% or 80% of the whole area.

BRIEF DESCRIPTION OF THE DRAWINGS

Other objects and advantages of the present invention will become apparent when the following detailed description of preferred embodiments and modifications thereof is read in conjunction with the accompanying drawings in which like reference numerals are used to indicate like parts in construction and function throughout the drawings and in which.

DETAILED DESCRIPTION OF THE INVENTION

Figure 1:
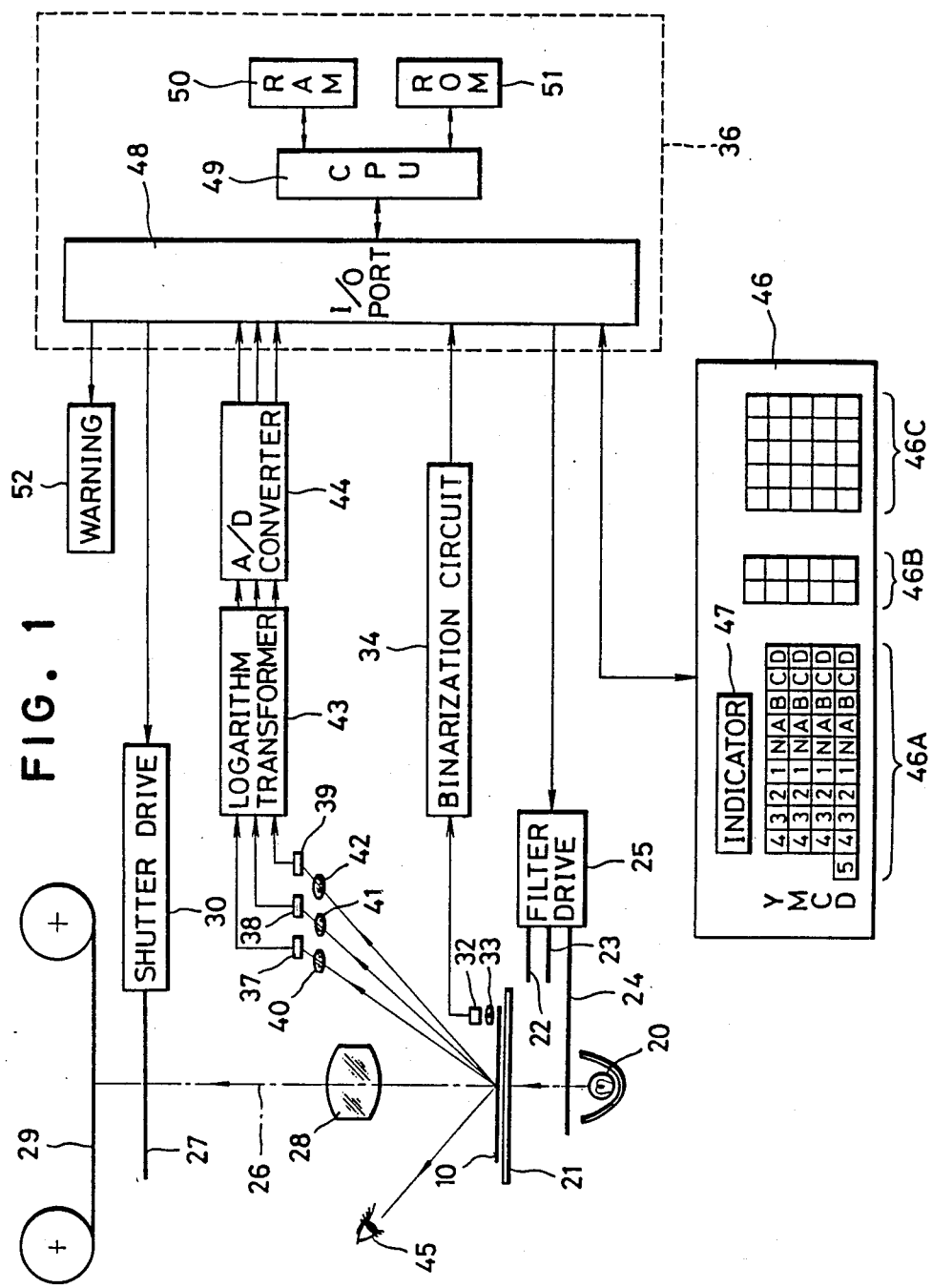
FIG. 1 is a schematic view of a color printing apparatus embodying the present invention.
Figure 2:
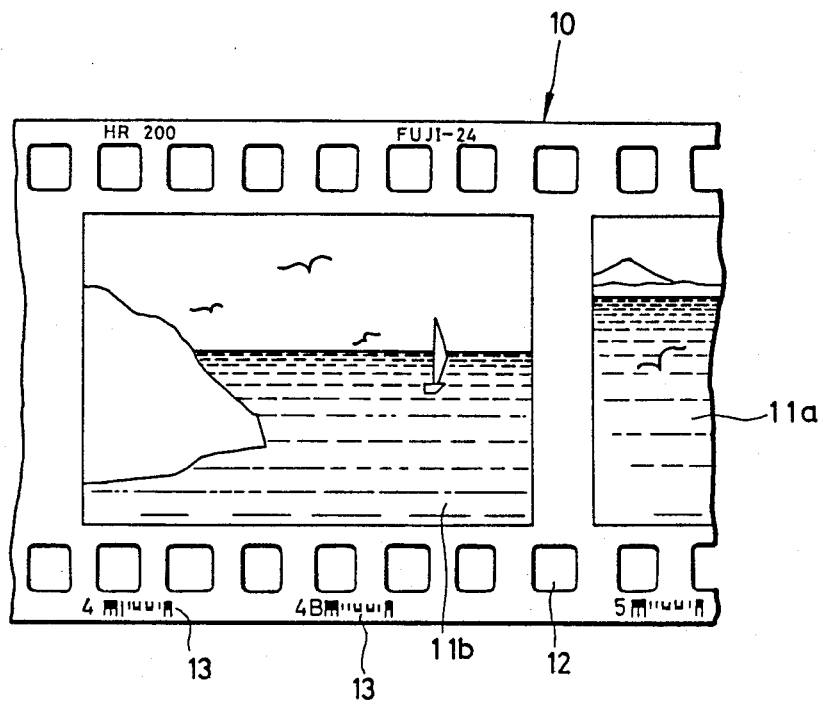
FIG. 2 is a plan view of a fragment of color film.

Referring now to FIG. 1 showing a printing apparatus embodying the present invention with which a keyboard cooperates in order to enter frame-dependent correction values therewith, there are shown a white light source 20 and a diffusion plate 21 so arranged as to illuminate a color negative film 10, with the result that diffused printing light emerges from the back of the negative film 10. There are provided, between the light source 20 and the diffusion plate 21, three color filters 22 to 24, namely yellow, magenta and cyan, for cutting off the corresponding complementary color components of the printing light, namely blue, green and red, respectively. These color filters 22 to 24 are controlled by a filter drive 25 to enter into the optical path 26 of a projection lens 28. A shutter 27 is provided to allow the printing light passing through a frame, for example the frame 11a, at a printing station to reach a color photographic paper 29. The shutter 27 is adapted to open and close under the control of a shutter drive 30. The negative film 10 from which prints are made includes a number of frame with visible images as shown in FIG. 2 wherein the frames 11a, 11b are shown by way of example. As is well known in the art and as is shown in FIGS. 2, the negative film 10 is provided with one row of perforations 12 at regular intervals on each longitudinal margin and with bar-codes 13 printed thereon outside the row of perforations 12. This bar-code 13 indicates the type of the negative film 10, for example in the shown illustration, as being HR-200. The bar-code 13 is formed as a latent-image on the negative film 10 by a so-called side printing apparatus in the manufacturing process thereof and is translated into a visible image upon development.

There is a bar-code reader 32 disposed relatively close to the negative film to read a bar-code 13 of a frame which is positioned just before the printing station. The bar-code reader 32 is adapted to receive light passing through a margin of the negative film 10 and then a lens 33 and to transmit the received light as an electric analog signal to a binarization circuit 34 where the analog signal is compared with a reference voltage to be converted into a binary signal; "1" or "0 (zero)" which in turn is transmitted to a control circuit 36.

To the upper right of the printing station as seen in FIG. 1, there is provided a photosensor arrangement comprising three pairs of lenses 40 to 42 and photosensors 37 to 39, one pair for each primary color, namely blue, green and red. Each lens 40, 41, 42 forms an image of a frame on the corresponding photosensor 37, 38, 39. Therefore, the respective photosensors 37 to 39 receive the corresponding color components of the light passing the whole area of the frame and convert them to electric signals by color which in turn are transmitted to a logarithm transformer 43 in order to provide large-area transmittance densities $D_B$, $D_G$ $D_R$ for blue, green and red. Each large-area transmittance density $D_i$ (where the suffix i means either one of the three primary colors) is transmitted to the control circuit 36 after having been converted into a digital form by an A/D converter 44.

A keyboard 46, which cooperates with the control circuit 36, is comprised of four parts, namely a correction key arrangement 46A, a function key arrangement 46B, an alphabetical and numeral key arrangement 46C and an indicator 47. Each key of the correction key arrangement 46A is manually operated by an inspector to input frame-dependent correction values (FDCV's) for exposure correction into the control circuit 36 when the inspector decides that the frame under inspection comprises an unusual negative image. Specifically, because the unusual negatives have densities beyond the automatically controllable limits of density in the LATD printing system, no fine color prints will be made from such unusual negatives in the LATD printing system if there is introduced no exposure correction. For this reason, if an unusual negative image is detected as a result of visual inspection, the inspector (indicated by an eye 45 in FIG. 1) determines the FDCV's necessary for exposure correction according to the pattern of the unusual image and then enters the FDCV's by manipulation of the keys of the correction key arrangement 46A so as to effect a proper exposure control for providing a fine color print with desirable color balance and density. These FDCV decisions are made one frame at a time, based on the inspector's experience.

There are provided, in the correction key arrangement 46A, three rows of color balance correction keys for yellow (Y), magenta (M), and cyan (C) and a single row of density correction keys (D). Each row of color balance correction keys includes, for example in this embodiment, four numeral keys and five alphabetical keys. The letters N, A, B, C and D stand for the numerals 0, −1, −2, −3 and −4, respectively. Each correction key is adapted to input a FDCV as the number of steps indicated on the key for correction either on the additive side or on the subtrative side. Therefore, the color correction can be made in four steps on each side for each color. However there is, in the row of density correction keys (D), a special numeral key with the figure of "5" indicated thereon which allows expanding the number of steps for density correction from five to thirteen. On the additive correction side, if it is required to make a more than five-step density correction, the special numeral key is pushed jointly with one of the numeral keys. That is, the special numeral key "5" should be pushed jointly with, for example, the numeral key "2" for a seven-step density correction and with the alphabetical key "N" for a five-step density correction.

The function key arrangement 46B is provided in order to make the input operation of the FDCV's simple. Each key of the function key arrangement 46B can input a previously set value committed thereto. Therefore these keys are used to input the FDCV's of certain kinds of negative frames such as the special light negatives whose FDCV's are previously known. It is desirable to provide in the function key arrangement 46B a correction key for cancelling wrong inputs.

The alphabetical and numeral key arrangement 46C is operated to set the coefficients of the exposure calculation equation (I), the FTDCV's and the like, to input manually the FTDCV's, and to control the operations of components of the color printing apparatus. The data input via each key is displayed in real time on the indicator 47 of the keyboard 46.

The control circuit 36 is a microcomputer comprising I/O port 48, CPU 49, RAM 50, and ROM 51, each component being known per se in the art, which is adapted to execute the control of the components or sections of the printing apparatus and the calculation of exposures by use of the exposure calculation equation (I) on the basis of a programmed sequence stored in the ROM 51. A warning device 52 is provided in conjunction with the control circuit 36 to give a warning of improper reading of the bar-code 13 by the bar-code reader 32 and to indicate the manual input of a FTDCV through one of the numerical and alphabetical keys 35. Alternatively, instead of actuating the warning device 52, it is permissible to treat color films as being of the same type as the standard color film, for example HR-100, or as being of the same type as of the previously treated one.

Figure 3:
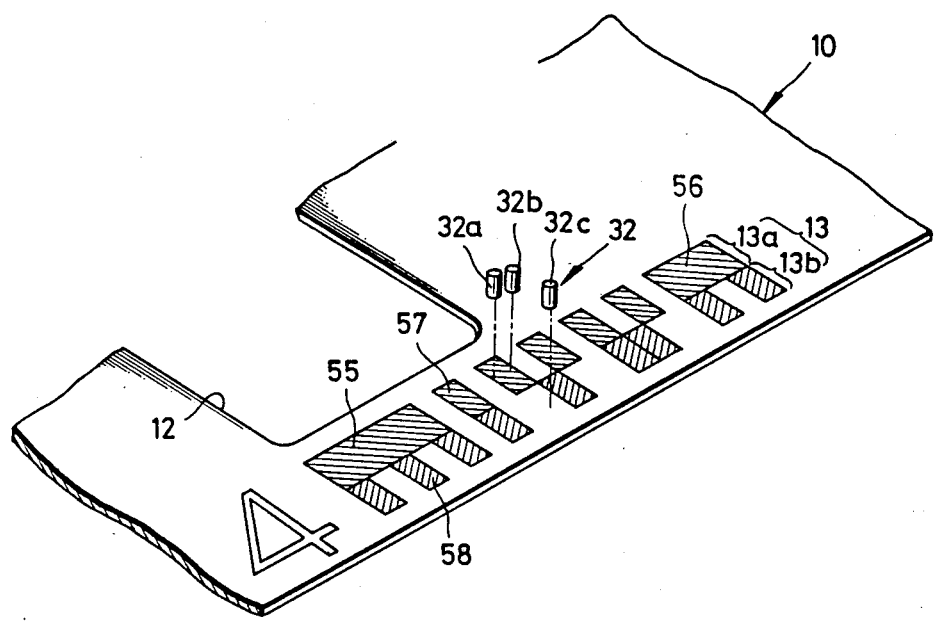
FIG. 3 is an enlarged illustration of a bar-code printed on a color film.

Referring to FIG. 3 explaining how to read a bar-code, there is shown a part of a developed color negative film 10 where a bar-code 13 has become visible as a result of development. The bar-code 13 comprises, in detail, a clock track 13a and a data track 13b indicating the type of the film 10. For reading these tracks 13a, 13b, there is, as described previously, the bar-code reader 32 comprising two photosensors 32a, 32b so disposed lengthwise as to read the clock track 13a and one photosensor 32c so disposed as to read the data track 13b. The clock track 13a includes a start mark 55 at its one end, an end mark 56 at its opposite end, and a plurality of clock marks 57 distributed at regular intervals between the start and end marks 55, 56. These bar-code marks 55 to 57 which are shaded in FIG. 3 are, for example, blackened and have a density higher than the base density of the color negative film 10. Whether a mark on the clock track 13a now being detected is the start mark 50 or the end mark 51 can be decided based on outputs from the photosensors 32a, 32b, 32c. That is, when the photosensor 32c detects a plurality of bar-code marks 58 on the data track 13b while a binarized signal "0 (zero)" is being produced from each of the photosensors 32a, 32b, the bar-code mark on the clock track 13a under detection is the start mark 55 or the end mark 56. Specifically, during the emission of the binarized signal "0 (zero)" from both the photosensors 32a, 32b, the photosensor 32c detects the marks 58 on the data track 13b, three for the start mark 55 and two for the end mark 56. On the other hand, the type of film is coded by an arrangement pattern of the bar-code marks 58 on the data track 13b positioned between the start and end marks 55, 56. The decision as to film type is made based on the combinations of the binary signals from the photosensor 32c. In the illustrated example, the photosensor 32c reads the film type indicated by the binary code "10110110011".

Figure 4:
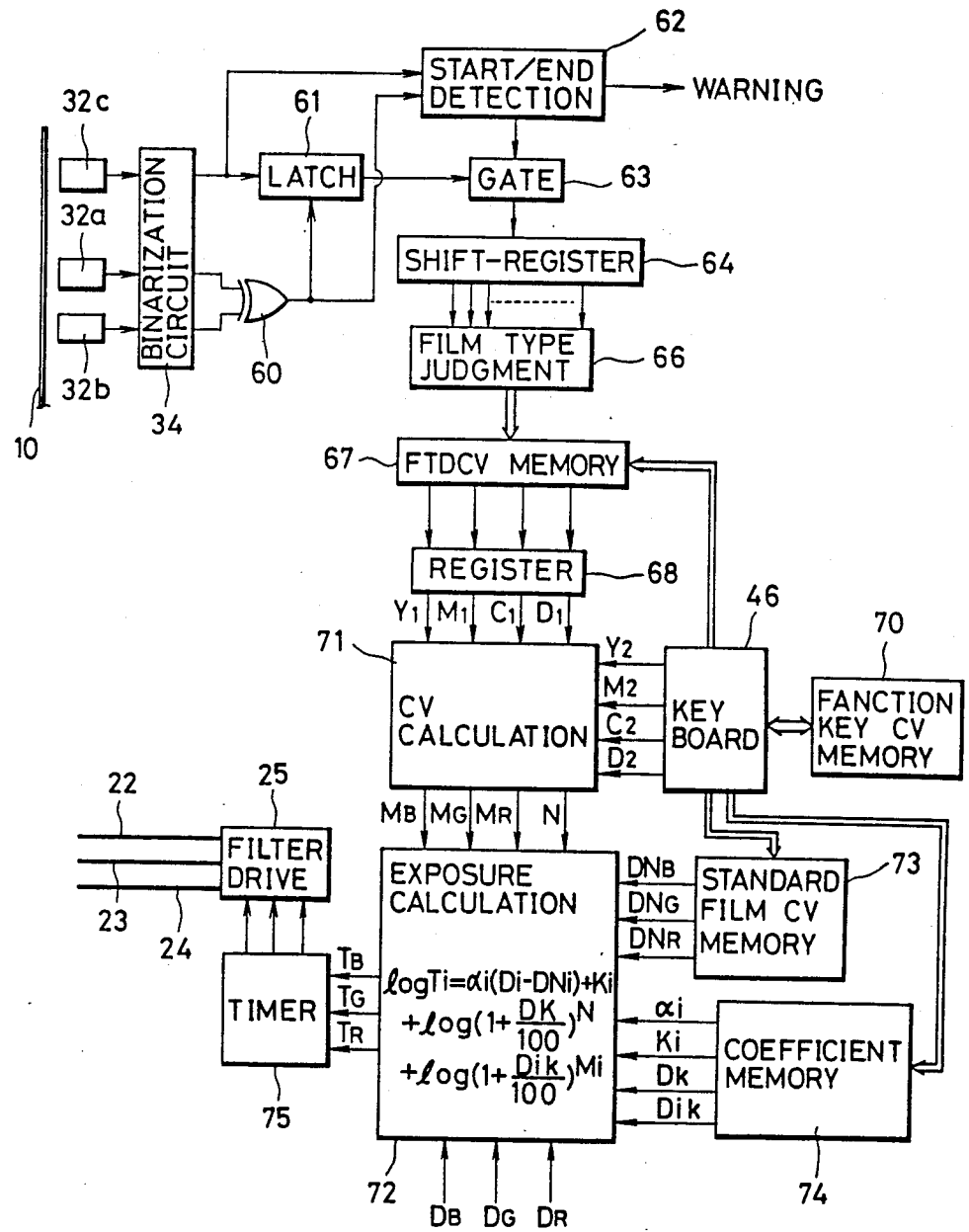
FIG. 4 is a functional block diagram showing the control circuit of FIG. 1.

Reference is now had to FIG. 4 illustrating the control circuit 20 of FIG. 1 shown in a functional block diagram, in which there is an exclusive OR circuit 60 to which the binary signals of the photosensors 32a, 32b are transmitted. The OR circuit 60 is adapted to provide, when simultaneously receiving same binary signals from the photosensors 32a, 32b, a coincidence signal which in turn causes a latch circuit 61 to latch binary signals from the photosensor 32c. At the same time, the coincidence signal is transmitted also to a start/end detector 62 and causes it to count the binary signals from the photosensor 32c in order to detect the start mark 55 or the end mark 56.

Upon the detection of the start mark 55, a gate circuit 63 is caused to open so as to allow the binary signals from the photosensor 32c to be transmitted to a shift-register 74. The gate 60 is closed when the start/end detector 62 detects the end mark 56. In the period between the opening and the closing of the gate 63, the film type data is stored in the shift-register 64 as a combination of binary signals, for example in this embodiment, "10110110011". If the start/end detector 62 detects neither the start mark 55 nor the end mark 56, it is assumed that the bar-code reader 32 has failed to read the bar-code 13 and the warning device 52 is actuated to give a warning.

The film type data stored in the shift-register 64 is then transmitted to a section 66 for film type judgment which can provide a film type signal corresponding to the judged film type and sends it to a memory 67. In the memory 67 there are stored FTDCV's corresponding to various types of color films. It should be noted at this point that the FTDCV's are divided into several steps in the form of an arithmetical progression. Each step corresponds to a predetermined difference in color balance or base density from the standard color film relative to the previous step, and the steps are represented by the keys in one-to-one correspondence.

The FTDCV's ($Y_1$, $M_1$, $C_1$, $D_1$) from the memory 62 are written in a register 68. It should be noted that the FTDCV's have been input into the memory 62 with the keyboard 46 having consideration for the actual conditions of the individual printing apparatus.

Each frame of the color negative film 10 positioned in the printing station is visually observed by the inspector (see FIG. 1). As a result of this visual inspection, if in fact the frame has an unusual negative image, the inspector operates the correction keys 46A to input the necessary FDCV's for $Y_2$, $M_2$, $C_2$ and $D_2$. In a correction value memory 70, there have been previously stored FDCV's corresponding to the respective function keys 46B. Any one of the function keys 46B can be pushed to read out a FDCV corresponding to the pushed key from the corresponding value memory 70.

A correction value calculation section 71 performs additive calculations to obtain the total correction values Y, M, C and D in accordance with the following equations:

$$Y = Y_1 + Y_2$$

$$M = M_1 + M_2$$

$$C = C_1 + C_2$$

$$D = D_1 + D_2$$

wherein the characters $Y_1$, $M_1$, $C_1$ and $D_1$ represent the correction values in dependence on the type of the film 10 and the characters $Y_2$, $M_2$, $C_2$ and $D_2$ represent correction values in dependence on the unusual negative image of the frame which is under inspection. For example, assuming that the negative film 10 has its FTDCV's 0, A, 1, and N for $Y_1$, $M_1$, $C_1$ and $D_1$, respectively and the negative image of the frame under inspection has its FDCV's 0, 2, B and 1 for $Y_2$, $M_2$, $C_2$ and $D_2$, respectively, the resulting total correction values Y, M, C and D are 0, 1, A and 1, respectively. It should be noted that no FDCV ($Y_2$, $M_2$, $C_2$, $D_2$) is input, the FTDCV's ($Y_1$, $M_1$, $C_1$, $D_1$) are used as the resulting total correction values (Y, M, C, D).

The characters Y, M, C and D stand for the total correction values necessary for yellow, magenta, cyan and density in the form of the numbers of correction increments. Because the exposure calculation equation gives the exposure of each primary color, characters $M_B$, $M_G$, $M_R$ and N can be substituted for the characters Y, M, C and D, respectively.

An exposure calculation section 72 receives correction data (Mi, N) from a correction value calculation section 71, the large area transmittance density of a standard frame from a standard color film memory 73, data ($\alpha i$, $\kappa i$) from a coefficient memory 74 and the large area transmittance density (Di) of a frame which a print is made to obtain, using the exposure calculation equation (I), and the exposure time Ti for each color, namely $T_B$ for blue, $T_G$ for green and $T_R$ for red.

The establishment of the initial operation conditions of the printing apparatus is effected with the keyboard 46 to write the data of the large area transmittance density DNi for each color, namely $DN_B$ for blue, $DN_G$ for green and $DN_R$ for red, into the standard color film memory 73, and the data of the coefficients $\alpha i$, of the constants $\kappa i$, of a changing rate (%) per each density correction step, and of a changing rate (%) per each color correction step.

Based on the exposure times $T_B$, $T_G$ and $T_R$ calculated in the exposure calculation section 72, a timer 75 causes the filter drive 25 to control the operation of the filters 22 to 24 for exposure time control. Specifically, the filter drive 25 normally keeps the filter 22 to 24 out of the optical path 26 of the projection lens 28 (see FIG. 1) but, when the shutter is opened as a result of a print start operation to allow the color photographic paper 29 to be exosed to the printing light, causes the respective filters 22 to 24 to come into the optical path 26 one after another after the corresponding exposure times $T_B$, $T_G$ and $T_4$ have elapsed so as to block the corresponding complementary color components of the printing light. After a time sufficient to expose one frame, the filter drive 25 causes the filters 22 to 24 to retract from the optical path 26 upon closing of the shutter 27.

Figure 5:
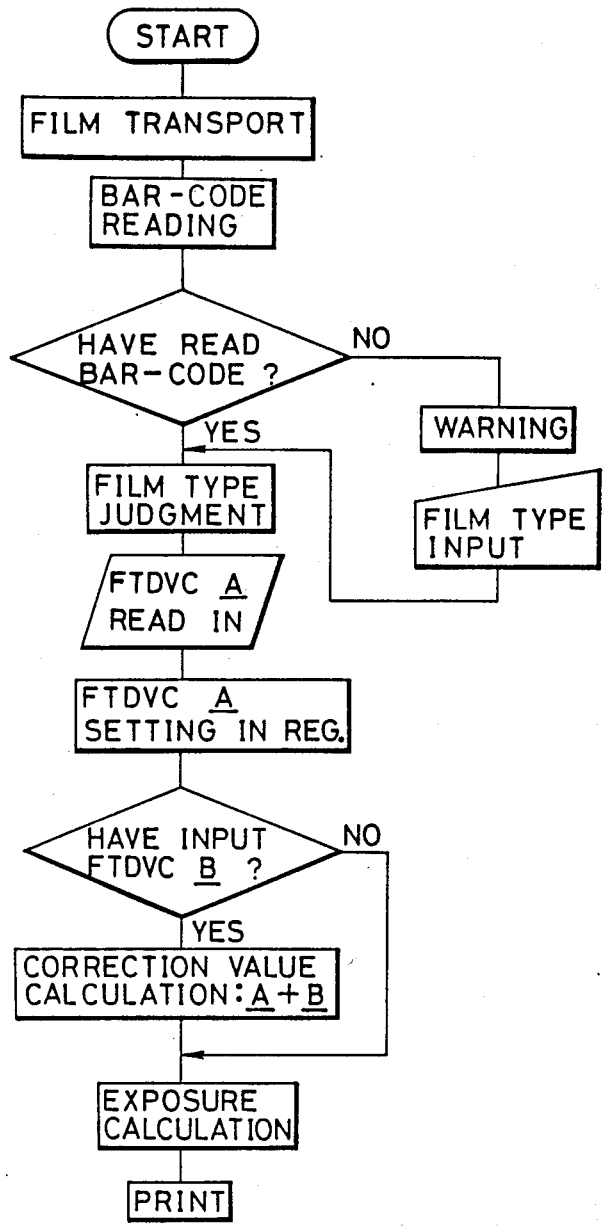
FIG. 5 is a flow chart showing the sequence of exposure calculation in the control circuit of FIG. 1.

The sequential operation of the printing apparatus shown in FIGS. 1 and 4 will be briefly described in conjunction with FIG. 5. At the outset, the color negative film 10 is intermittently advanced to position each frame at the printing station. During this intermittent advance, the bar-code reader 32 reads the bar-code 13 on the margin of the color negative film 10. If in fact there is a failure of reading the bar-code 13, the warning device 52 is actuated to give a warning. If this happens, the operator inputs manually the data of the film type, using the keyboard 46. Next, the film type judgment is made based on the bar-code 13. According to the film type judged in the film type judgment section 66, a corresponding FTDCV A is read out from the memory 67 and input into the register 68. If the frame includes an unusual negative image, a FDCV B is input, using either the correction key arrangement 46A or the function key arrangement, into the correction value calculation section where the FTDCV A and FDCV B are added. The resulting correction value is then substituted into the calculation equation during the exposure calculation step, providing the exposure time Ti by which the amount of exposure light is controlled so as to make a print with proper color balance and density from the negative frame.

Figure 6:
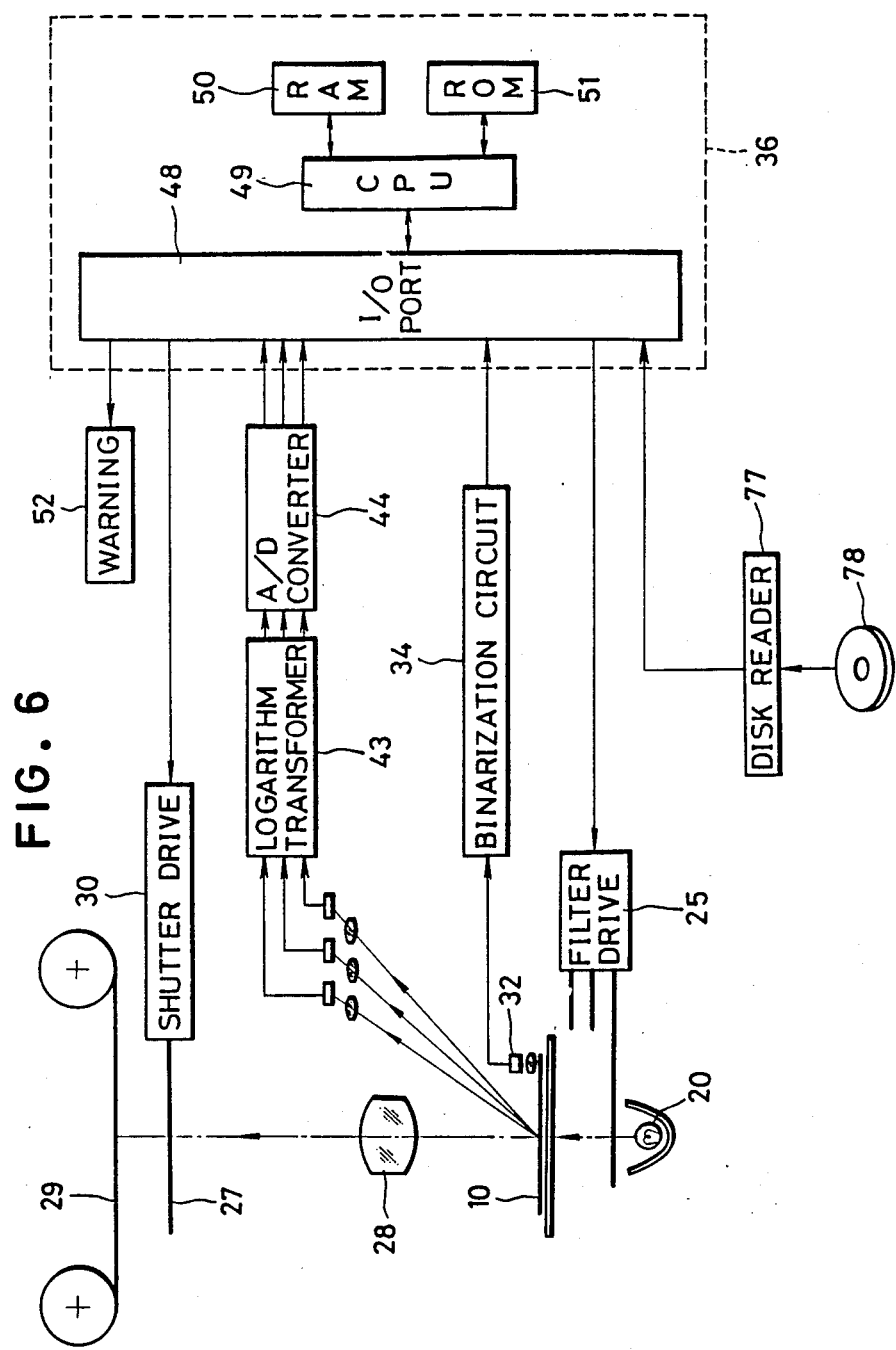
FIG. 6 is a schematic illustration of a color printing apparatus embodying the present invention in which a recording medium is used for providing frame-dependent correction values for exposures.

FIG. 6 shows the printing apparatus of another embodiment of the present invention which is capable of high speed continuous printing. The printing apparatus in this embodiment is equipped with a recording medium reader such as a disk reader 77 in place of the keyboard 46 in the embodiment shown in FIG. 1. On a magnetic disk such as a floppy disk 78 there are recorded FDCV's of respective frames of the color negative film 10 which are classified upon inspection based on the inspector's experience. When making prints from the color negative film 10, in synchronism with the intermittent advance of the color negative film 10, the disk reader 77 reads out the FDCV corresponding to a frame of unusual negative image positioned in the printing stage from the floppy disk 78. This FDCV is added to a FTDCV of that frame which is automatically read by the bar-code reader 32 for providing an exposure correction value of that frame. The exposure correction value and the large area transmittance density are substituted into the exposure calculation equation (I) to obtain the exposure time Ti for making a proper color print from the frame of the color negative film 10.

In this embodiment, it is permissible to use a combination of a tape reader and a paper tape (not shown) in place of the disk reader 77 and the floppy disk 78. The tape is punched with dotted codes of FDCV's in accordance with the frames of unusual negatives by a dot puncher (not shown) well known per se.

Figure 7:
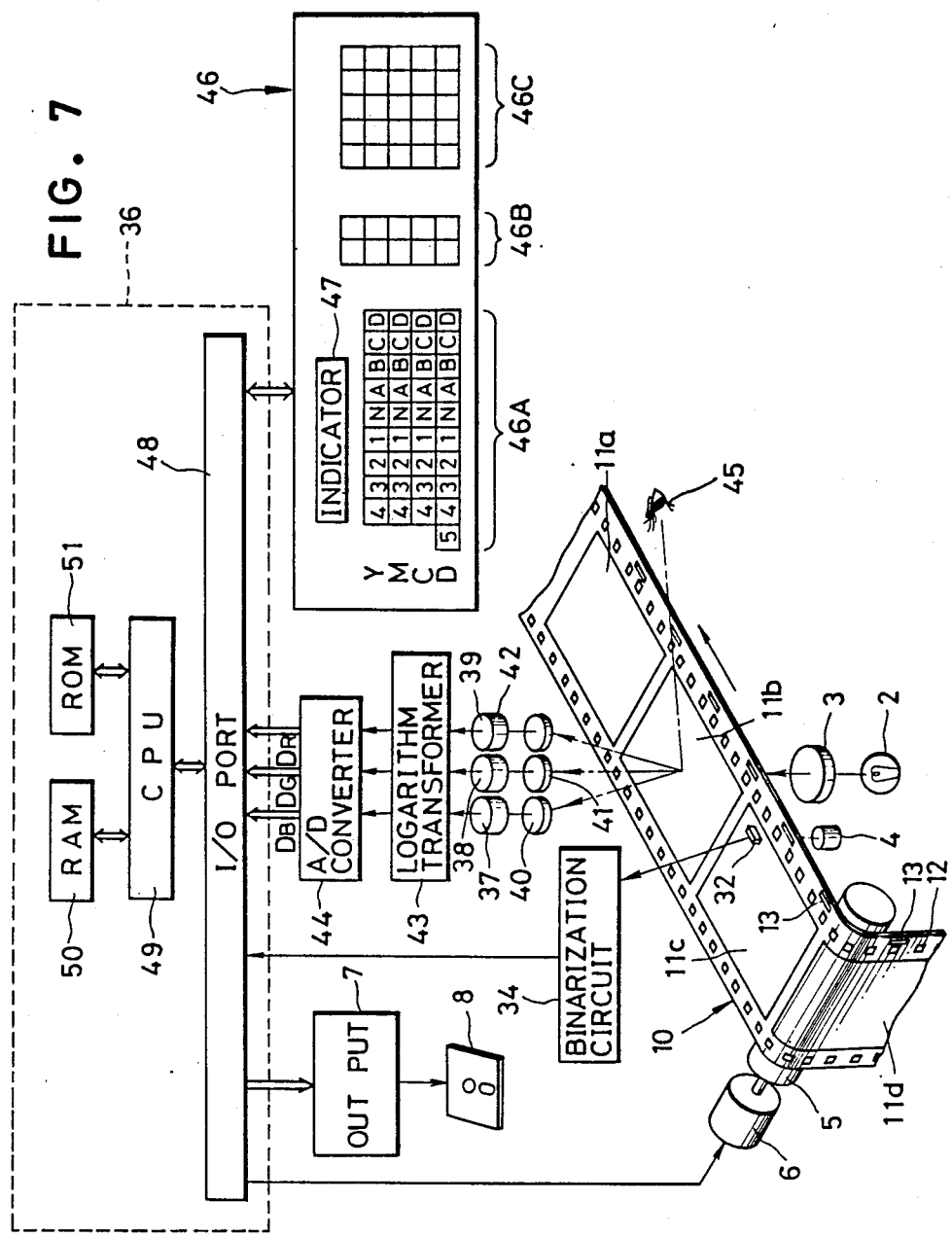
FIG. 7 is a schematic view of a negative inspecting apparatus embodying the present invention.

Reference is now had to FIG. 7 showing a negative inspection apparatus embodying the method of the present invention. A color negative film 10 with frames of visible negative images 11a to 11d, for example, is intermittently advanced in the direction shown by an arrow, frame by frame. This advance is effected by means of a rotatable roller 5 rotated by a motor 6. At an inspection station wherein a frame is to be inspected, for example in which the frame 11b is located, there are an illuminating means comprising a white light source 2 and a lens 3 disposed below the color negative film 10, and the same photosensor arrangement as in the printing apparatus of FIG. 1 disposed above the color negative film 10. An inspector (indicated by 45) judges the FDCV of the unusual negative image of the frame 11b based on his or her experience and inputs the FDCV with a key of the correction key arrangement 46A in the same manner as described in connection with the embodiment of FIG. 1. Adjacent the white light source 2, there is a light emitting means such as a LED 4 for illuminating the bar-code 13 of the color negative film 10. Opposite to the LED 4 relative to the color negative film 10, there is the same bar-code reader 32 as described in connection with the embodiment of FIG. 1, which receives the transmitted light from the LED 4 which has passed through the margin including the bar-code 13 of the color negative film 10 and translates this light into an electric signal which in turn is transmitted to the circuit 34 for binarization. According to the bar-code, the film type of the color negative film 10 is automatically recognized in the control circuit 36. Based on the film type and the FDCV's of the frame 11b, in just the same manner as described for the embodiment of FIG. 1, the exposure time Ti is automatically calculated by use of the exposure calculation equation (1) in the control circuit 36. The resulting exposure time Ti for each color is output as an electric signal through an output section 7 to be recorded on a floppy disk 8. This operation is repeated as many times as the number of frames of the color negative film 10.

Figure 8:
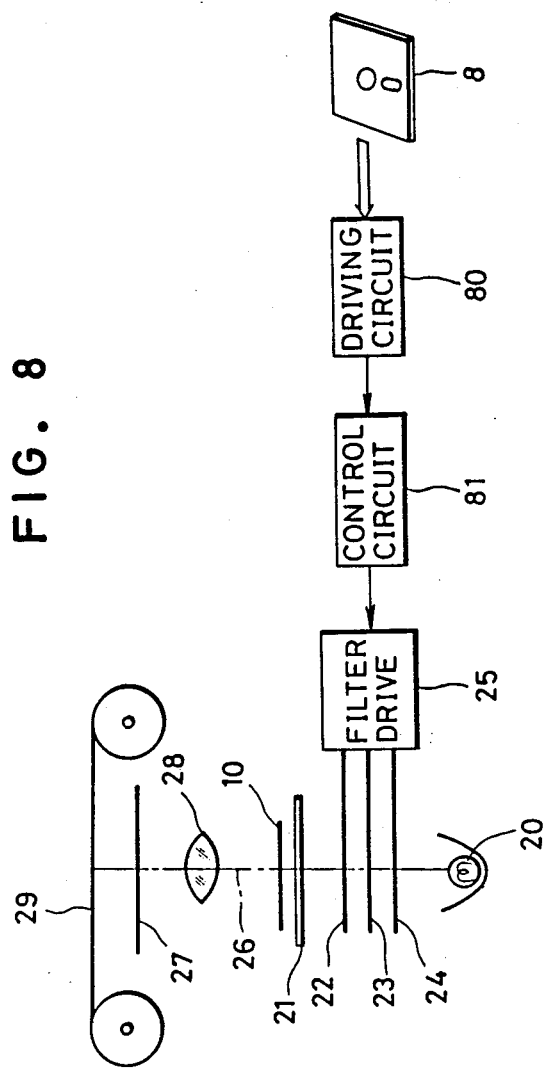
FIG. 8 is a schematic view of a color printing apparatus in which exposures are correctively controlled by use of a recording medium with the data recorded thereon by the negative inspecting apparatus of FIG. 7.

As shown in FIG. 8, the floppy disk 8 is driven by a drive circuit 80 which includes a disk reader similar to the disk reader 77 of FIG. 6 for reading out the data of the FDCV's from the floppy disk 8. The FDCV is sent into a control circuit 81 whose construction and function is made the same as that of the control circuit 36 of FIG. 6 and is added to a FTDCV to provide an exposure time Ti for each color. This provision of the exposure time Ti is effected in the same manner as in the embodiment previously described in connection with FIGS. 1 through 6. According to the exposure time Ti, the filter drive 25 is caused to drive each filter 22, 23, 24 so as to make a proper color print even from the frame of an unusual negative image.

In the above-described embodiment, although the proportion of the three primary color components of printing light is controlled by inserting the cyan, magenta and yellow filters into the path of printing light at the ends of the respective primary color exposures, it is permissible to use a light-balancing device which is adapted to adjust the duration of insertion of each color filter, namely cyan, magenta and yellow, into the light path so as to vary the proportions of the three primary color components of the printing light. When using the light-balancing device, the exposures of the three colors are completed simultaneously at the time of the closing of the shutter.

It should be understood that this invention is also applicable to an additive color printing system in which the three primary color printing lights adjusted as to brightness are projected onto a negative film.

Because certain changes may be made in the above-described exposure correction method without departing from the scope of the present invention, it is intended that all matter contained in the above description or shown in the accompanying drawings shall be interpreted as illustrative and not limiting.

What is claimed is:

1. An exposure correction method for photographic color printing of the type in which three primary color exposures are controlled so as to perform standard exposure for a standard frame of a specific type of color film, said film having a coded mark thereon indicating said film type; said method comprising
    establishing film type-dependent correction values which are based on available color films relative to said specific type of color film;
    determining frame-dependent correction values according to the differences in color balance and in density of a frame of said color film from said standard frame;
    reading said coded mark of said color film to retrieve one of said film type-dependent correction values;
    adding said frame-dependent correction values to said retrieved film type-dependent correction value to obtain a total correction value for each color;
    correcting said standard exposure by the amount of said total correction value; and
    making a color print using the thus-corrected standard exposure.

2. A method as defined in claim 1, wherein said frame-dependent correction value determination is executed prior to printing and the determined correction value is recorded on, and upon printing is retrieved from, a recording medium.

3. A method as defined in claim 2, wherein said frame-dependent correction value determination is executed on a plurality of frames consecutively.

4. A photographic exposure correction method for LATD color printing wherein each printing exposure to three primary colors is correctively controlled in accordance with the difference between the color densities of a standard film of a specific type of color film and the color densities of a frame of an available color film having a coded mark thereon indicating the film type thereof, said method comprising
    establishing film type-dependent correction values according to the differences of various types of said available color films from said specific type of color film;
    determining frame-dependent correction values according to the differences in color balance and in density of said frame of said color film from said standard frame;
    reading said coded mark of said color film to retrieve one of said film type-dependent correction values;
    adding said frame-dependent correction values to said retrieved film type-dependent correction value to obtain a total correction value for each color;
    correcting said exposure by the amount of said total correction value; and
    making a color print using the thus-corrected exposure, thereby to obtain a color print with proper color balance and density.

5. A photographic color printing apparatus in a LATD printing system wherein each printing exposure to three primary colors is correctively controlled in accordance with the difference between the color densities of a standard film of a specific type of color film and the color densities of a frame of an available color film from which color prints are made, said color film having a coded mark thereon indicating the film type thereof, said apparatus comprising
    memory means for storing therein film type-dependent correction values according to the differences of various types of said available color films from said specific type color film;
    means for providing in said apparatus frame-dependent correction values according to differences in color balance and in density of said frame of said color film from said standard frame of said specific type of color film;
    means for reading said coded mark of said color original film to judge its film type and to retrieve one of said film type-dependent correction values corresponding to said judged film type from said memory means;
    means for adding said frame-dependent correction values to said retrieved film type-dependent correction value to obtain a total correction value for each color;
    means for correcting said exposure by the amount of said total correction value; and
    means for making a color print using the thus-corrected exposure, thereby to obtain a color print with proper color balance and density.

6. An apparatus as defined in claim 5, wherein said frame-dependent correction value providing means is a keyboard arrangment adapted to change said correction values by predetermined different increments.

7. An apparatus as defined in claim 5, wherein said frame-dependent correction value providing means includes at least a recording medium on which said frame-dependent correction values are recorded for a plurality of frames prior to printing and from which said frame-dependent correction values are retrieved frame by frame upon printing.

* * * * *